United States Patent [19]

Sawai et al.

[11] 4,107,133

[45] Aug. 15, 1978

[54] COLORED POLYETHYLENE MOLDING COMPOSITIONS

[75] Inventors: Hideo Sawai, Takatsuki; Satoshi Hirabayashi, Nagaokakyo; Shigezi Sato, Nishinomiya, all of Japan

[73] Assignee: Dainippon Ink & Chemicals, Inc., Tokyo, Japan

[21] Appl. No.: 538,388

[22] Filed: Jan. 3, 1975

[30] Foreign Application Priority Data

Jan. 14, 1974 [JP] Japan .................................. 49-7228
Dec. 23, 1974 [JP] Japan ................................ 49-146848

[51] Int. Cl.$^2$ .......................... C08K 5/04; C08K 5/08; C08K 9/00; C08L 23/06
[52] U.S. Cl. .............................. 260/42.15; 106/308 R; 106/308 Q; 106/309; 260/42.14; 260/42.16; 260/42.21

[58] Field of Search ...................... 106/19, 20, 23, 31, 106/32, 272, 287 SB, 308 R, 308 Q, 309; 252/62.1; 427/212, 220, 54, 256; 428/403; 260/42.14, 42.15, 42.16, 42.21

[56] References Cited

U.S. PATENT DOCUMENTS

| Re. 27,490 | 9/1972 | Greig ................................. 427/23 X |
| 3,023,181 | 2/1962 | TeGrotenhuis ........... 106/287 SB X |
| 3,025,173 | 3/1962 | Bernstein ............................... 106/32 |
| 3,025,179 | 3/1962 | Holbein ..................... 106/287 SB X |
| 3,290,165 | 12/1966 | Iannicelli ........................ 106/308 N |
| 3,650,814 | 3/1972 | Elder, Jr. ............................. 428/405 |
| 3,682,688 | 8/1972 | Hughes et al. ...................... 106/20 X |
| 3,697,475 | 10/1972 | Morris et al. ..................... 260/42.15 |
| 3,808,019 | 4/1974 | Spange et al. ................... 106/272 X |

*Primary Examiner*—Allan Lieberman
*Attorney, Agent, or Firm*—Sherman & Shalloway

[57] ABSTRACT

A coloring composition for polyethylene which comprises organic pigment and at least one organometal compound selected from the group consisting of organosilane compounds and organotitanium compounds.

6 Claims, No Drawings

COLORED POLYETHYLENE MOLDING COMPOSITIONS

This invention relates to coloring compositions which, when used for coloring plastic molded articles, cause no deformation of the articles by shrinkage. More particularly, the invention relates to coloring compositions exhibiting excellent effect, particularly with polyethylene which is apt to shrink upon molding when colored with organic pigment.

In the manufacture of shaped articles of plastics, the deformation due to shrinkage of the articles must be carefully considered in advance. Such shrinkage may be induced by external causes such as molding temperature, temperature of the mold, configuration of the mold, injection conditions, or the like, as well as by the internal causes, for example, nature of the resin employed and the additives contained therein. Generally, the internal causes are the main factors in deformation due to shrinkage. Polystyrene, methyl methacrylate, polycarbonate, vinyl chloride resins, AS resins and ABS resins, are examples of moldable resins which generally present no substantial problem of deformation due to shrinkage. It is known, however, that polyacetal resins and polyolefin resins show considerable shrinkage themselves during shaping, and it is also known that polyolefin resins, particularly polyethylene, are notably affected by the pigment which is used as one of the additives. For this reason, the inorganic pigments such as carbon black, cadmium yellow, cadmium red, chrome yellow, red iron oxide, ultramarine, and the like, which never cause the deformation due to shrinkage, and which exhibit excellent heat resistance and weather-proofing property, are conventionally used in most occasions as the coloring agent of polyethylene.

However, the plastic molded articles colored with cadmium-, chromium-, or lead-containing inorganic pigments are potential sources of pollution to soil because of the heavy metals contained therein, such as the cadmium, chromium, lead etc., when discarded. It has been recently strongly desired to replace the inorganic pigments with organic pigments as the coloring agent, in order to prevent such soil pollution, and also to utilize the richer variety of colors of the latter which cannot be attained with the inorganic pigments.

However, the predominant majority of the organic pigments which can withstand the high temperatures employed for the molding procedures and the many hours of outdoors exposure possess the undesirable property of promoting shrinkage of the articles being molded, when they are used as the coloring agent of polyethylene, and only colored articles of inferior dimensional stability can be obtained. With the steadily increasing use of large size polyethylene containers of high dimensional stability for accommodating drinking water, fruits, and the like, it has now become the key problem to improve the above-described deficiencies, in order to successfully use organic pigments as the coloring agent of polyethylene molded articles.

Accordingly, an object of the present invention is to provide colored molded articles of improved dimensional stability, by preventing the shrinkage taking place in the molding of polyethylene which is colored with a coloring composition comprising organic pigments, and also preventing the deformation caused by such shrinkage.

A further object of the invention is to provide coloring compositions for making such colored shaped articles.

According to the invention, the foregoing objects are accomplished by a coloring composition which comprises organic pigment and at least one organometal compound selected from the group consisting of organosilane compounds and organotitanium compounds.

Our observations revealed that the shrinkage or deformation of polyethylene molded articles colored with organic pigment is caused by the effect of surface energy of the pigment on the nucleation energy of polyethylene, rather than the particle sizes or configuration of crystals of the pigment. It being understood that the invention is not restricted by the basic, we believe that the presence of the organometal compound according to the invention changes the surface energy of organic pigment, and hence improves the dimensional stability of the colored molded articles.

The aforementioned organometal compounds are known to have many utilities, such as a modifier to improve water-proofing property, heat resistance and chemical resistance, or an adhesiveness-improving agent, in the paint field; also the adhesiveness-improving agent between inorganic filler and organic matrix, in the field of reinforced plastics; water-repelling agent of fibers; and an additive to fuel and lubricating oil, etc. It is entirely unexpected, however, that the organosilane compounds and/or organotitanium compounds show the conspicuous effect for preventing the shrinkage or deformation of polyethylene molded articles caused by organic pigments.

According to the invention, any of the known organic pigments which well withstand the high temperatures of molding and also exhibit excellent weather-proofing property can be used, examples of which include insoluble azo-, condensed azo-, phthalocyanine-, quina- cridone-, perynone-, perylene-, isoindolinone-, anthra- quinone-, and dioxazine-type pigments.

The organosilane compounds suited for use in the invention are those of the class already known as the silane coupling agent, which are disclosed, for example, in S. Sterman & J. G. Marsden, "Silane Coupling Agents" in Whittington, *Dictionary of Plastics.* (Technomic Publlishing Co., Inc.) 1968, p. 218, and in *Modern Plastics Encyclopedia,* 1967 (Sept. 1966/Vol. 44, No. IA) p. 416 ff.; as well as in U.S. Pat. No. 3,650,814. Such organosilane compounds can be expressed by the general formula,

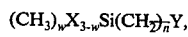

pr

in which
X is an optional hydrolyzable group such as alkoxy, aroxy, amino, acetoxy, and the like, normally an alkoxy group of 1–4 carbon atoms,
$w$ is 0 or 1,
$n$ is 0 or an integer of 1–4, and
Y is a functional group such as vinyl (only when $n$ equals zero), halogen, methacryloxy, cyclic epoxy, glycidoxy, mercapto, amino, diamino, ureido, and the like.

Examples of specific compounds covered by the above general formula include the following:

γ-aminopropyltriethoxysilane,
γ-aminopropyltrimethoxy silane,
β-aminoethyltributoxysilane,
N-γ-(aminopropyl) γ-aminopropyltriethoxysilane,
N-β-(aminoethyl) γ-aminopropyltrimethoxysilane,
β-(3,4-epoxycyclohexyl) ethyltrimethoxysilane,
γ-glycidoxypropyltrimethoxysilane,
γ-glycidoxypropyltriethoxysilane,
γ-mercaptopropyltrimethoxysilane,
γ-methacryloxypropyltrimethoxysilane
γ-acryloxypropyltrimethoxysilane,
vinyltrimethoxysilane,
vinyltriethoxysilane,
vinyltris(β-methoxyethoxy)silane,
vinyltrichlorosilane,
vinylacetoxysilane,
γ-chloro-propyltrimethoxysilane,
methyltriethoxysilane,
dimethyldiethoxysilane, and
tetraethoxysilane.

Of these organosilane compounds, particularly aminoalkoxysilane compounds show conspicuous effect on the organic pigments compared with other organosilane compounds, and can almost completely prevent the shrinkage or deformation of colored molded articles, thus being the most preferred.

The organotitanium compounds which are used either in place of, or together with, the organosilane compounds are disclosed, for example, in Dynamit Nobel, *Tech. Reports,* Zn 267/7, 72/6 424 (july, 1972), E. I. du Pont de Nemours & Co., "Titanium Organics," and British Pat. No. 734,114. Of the many organotitanium compounds, particularly (1) alkyltitanates obtained from titanium tetrachloride and alcohol or phenolic derivatives of 2-20 carbons, such as tetraethyl titanate, tetra-n-propyl titanate, tetraisopropyl titanate, tetra-n-butyl titanate, tetra-2-ethyl-hexyl titanate, tetranonyl titanate, tetraphenyl titanate, tetracresyl titanate, tetraacetyl titanate, tetrastearyl titanate, and their dimers to dodecamers; (2) acylates obtained from the foregoing alkyltitanates and saturated or unsaturated carboxylic acids of 2 - 20 carbon atoms, such as acetic, propionic, butyric, acrylic, methacrylic, myristic, palmitic, stearic, oleic, linoleic, and linolenic acids; and (3) chelated titanium compounds obtained from the above alkyltitanates and chelating agent, examples of the chelating agent including β- diketones such as acetylacetone, propionylacetone, benzoylacetone, and dibenzoylmethane; β-keto acid esters such as methyl acetoacetate, ethyl acetoacetate, methyl diacetylacetate, ethyl diacetylacetate, and ethyl benzoylacetate; 1,3-propanediol derivatives such as 1,3-propanediol, 2,2-dimethyl-propane-1,3-diol, trimethylolpropane, 1,3-butanediol, and 2,4-pentanediol; salicyoyl derivatives such as methyl salicylate, ethyl salicylate, and salicylaldehyde; lactic acid; dihydroxymaleic acid; diacetone alcohol; ethylene glycol; and triethanolamine; are preferred. Inter alia, in most cases the use of alkyltitanate polymers, acylates, and chelates are preferred, for their relatively high stability and ease of handling.

According to the invention, the shrinkage of colored polyethylene molded articles can be prevented by blending into the coloring composition, no less than 0.1 part by weight of such organometal compound per 100 parts by weight of organic pigment, regardless of which organosilane compound and organotitanium compound is used. Normally the satisfactory effect can be expected by the blending of 5 - 30 parts by weight of the organometal compound per 100 parts by weight of the organic pigment, excepting the case of making paste color which requires larger amount of organometal compound.

The organic pigment blended with the organometal compound according to the invention may, when once dried, exhibit reduced dispersibility in the polyethylene molding material, because the pigment particles come to show stronger tendency for agglomeration. In that case, coloring compositions of better dispersibility can be easily obtained, by forcibly breaking the agglomeration by mechainical power, and/or adding an agglomeration-preventing agent.

The agglomeration-preventing agent can be suitably selected from, for example, the following: metallic soap such as stearate, oleate, laurate or palmitate of zinc, aluminum, calcium, barium, magnesium, cadmium, or lead: wax such as the polyethylene wax of 1,000 - 15,000 in molecular weight, natural or synthesized paraffine wax; liquid paraffin: anionic activating agent such as naphthalenesulfonic acid-formaldehyde condensate, cresolsulfonic acid-formaldehyde condensate, ligninsulfonic acid-formaldehyde condensate, dialkylsulfosuccinate, alkylallylbenzenesulfonate, bis-naphthalensulfonate, alkylbenzenesulfonate, alkylnaphthalenesulfonate, and ligninsulfonate: non-ionic activating agent such as polyethylene glycol alkylphenolethers, e.g., polyoxyethylene nonyl phenolether, polyoxyethylene isooctyl phenolether, and polyoxyethylene dodecyl phenol ether; polyethylene glycol alkylethers, e.g., polyoxyethylene laurylether, polyoxyethylene cetylether, and polyoxyethylene stearylether; aliphatic acid esters of polyethylene glycol such as polyoxyethylene laurate, polyoxyethylene myristate, and polyoxyethylene stearate; sorbitan alkyl esters, e.g., sorbitan monolaurate and sorbitan monostearate; polyethylene glycol-aliphatic acid amides, e.g., polyoxyethylene laurylamide and polyoxyethylene stearylamide; and polyethyleneglycol-aliphatic amines, e.g., polyoxyethylene laurylamine and polyoxyethylene stearylamine: and cationic activating agent such as alkyl trimethylammonium chloride, e.g., lauryltrimethylammonium chloride, palmitintrimethylammonium chloride, and stearyltrimethylammonium chloride.

The suitable quantitative ratio of the agglomeration-preventing agent in the coloring composition differs considerably depending on the state of use of the composition, but in any case it should be at least 1% by weight to the total sum of the organic pigment and organometal compound. Normally satisfactory results can be obtained when it ranges from 20 - 200%. Excessive use of the agglomeration-preventing agent should be avoided, because such is detrimental to the physical properties of the plastic material.

The coloring composition of the invention may take any of such forms as paste color, dry color, and master batch, depending on the intended utility of the composition. The composition can be prepared by thoroughly mixing the system to cause good adhesion of the organometal compound to the organic pigment, but for effectively preventing the shrinkage by a small amount of organometal compound, it is recommended that the compound should be diluted with a suitable diluent. Examples of useful diluents include alcohols such as methanol and ethanol; ketones such as methyl ethyl ketone and methyl isobutyl ketone; ethers such as methylether, ethylether, and petroleum ether; aromatic organic solvents such as benzene, toluene, and xylene; methyl cellosolve; chloroform; and the like.

Typical methods of making the coloring compositions of the invention will be shown hereinbelow: (1) the paste color can be prepared by mixing the organic pigment with an excess of organometal compound in a homomixer; (2) the dry color can be prepared by (a) mixing the organic pigment, organometal compound, and an agglomeration-preventing agent in a Henschel mixer as they are, or (b) further adding, to the above mixture, an organic solvent or a mixture of organic solvent-water, to effect solution-mixing or gellation-mixing, followed by drying and grinding. Finally, (3) the master batch can be prepared by melt-extruding the paste color or dry color together with the moldable polyethylene resin, and pelletizing the extrudate.

The moldable polyethylene resin to which the coloring composition of the invention is to be applied comprises the known medium-pressure and low-pressure polyethylene prepared by any of solution polymerization, slurry polymerization, particle form polymerization, vapor phase polymerization, and the like. Those methods of polymerization are also internationally known by such names as Phillips method, Standard method, Ziegler process, etc. according to the type of the catalyst employed for the polymer-making. The medium- and low-pressure polyethylenes used for this invention are the high-density, moldable polyethylene having a melt index (M.I.) of no more than 50, and a density of at least 0.94 g/cm$^3$. Normally ethylene homopolymer is the most frequently employed, but in order to improve such physical properties as high-speed processibility, stretch-cracking resistance, impact strength, printability, etc., ethylene copolymers obtainable from ethylene and other monomers such as propylene, 1-butene, or 1-hexene [N. G. Taylord, H. F. Mark, "Linear and Stereoregular Addition Polymers" N.Y. (1959)] and blends of polyethylene with other polymers such as polypropylene (U.S. Pat. Nos. 3,153,681 and 3,355,520), ethylene-propylene copolymer (British Pat. Nos. 1,037,819, 1,037,820, and 1,084,350), ethylene-butene copolymer (U.S. Pat. No. 3,361,607), ethylene-vinyl acetate copolymer (British Pat. No. 967,334), ethylene-acrylic acid copolymer (Belgian Pat. No. 633,686) and the like, may also be used.

Hereinafter the invention will be more specifically explained with reference to the working Examples, in which the degree of deformation and shrinkage given were measured by the following methods.

1. Deformation

A disc of 120 mm in diameter and 2 mm in thickness was molded through a 3 oz. in - line type injection molding machine, at the molding temperature of 220° C., which was allowed to stand for the subsequent 48 hours at 25° C., and then placed on a horizontal table. If the whole of the disc face came in perfect contact with the table surface due to absence of curvature, the deformation was recorded to be zero (cm). Otherwise the edge portion of the disc farthest from the table surface was pushed down until it came to contact the table, and in that state the vertical distance (cm) between the position of the edge at the highest level and the table was measured and recorded as the deformation.

2. Shrinkage

A 140-mm long, 80-mm wide, and 2-mm thick plate was molded through a 3 oz. in-line type injection molding machine, at the molding temperature of 220° C. Thereafter the plate was allowed to stand for 48 hours at 25° C., and its longitudinal length (that of the direction of resin flow, mm) was measured. The shrinkage was calculated according to the equation below:

$$\text{Shrinkage (\%)} = \frac{140 - \text{measured value}}{140} \times 100.$$

EXAMPLE 1

A paste color was formed by blending 100g of Isoindolinone Yellow (Pigment Yellow 109) with 200 g of N-$\beta$(aminoethyl)-$\gamma$-aminopropyltrimethoxysilane in a homomixer for 30 minutes. Three (3) grams of this paste color was blended with 1000 g of a high-density polyethylene (M.I. 6; density, 0.970g/cm$^3$) in a tumbler, milled with two rolls which were heated at 170° C., and ground. The colored powder thus obtained was molded into a plate through an injection molding machine, and its deformation and shrinkage were measured, with the results as shown in Table 1 below.

CONTROL 1

One (1) g of the pigment used in Example 1 and 1000 g of the same high-density polyethylene were dry-blended in a tumbler. Thus a dry color containing none of the organometal compound was prepared. Thereafter a similar colored plate was formed through the identical procedures with Example 1, and its deformation and shrinkage were measured. The results were as given also in Table 1.

For reference, the similarly measured values of the polyethylene plate containing neither pigment nor the organometal compound, but otherwise prepared in the identical manner, are concurrently shown.

Table 1

|  | Deformation (cm) | Shrinkage (%) |
|---|---|---|
| Example 1 | 0 | 1.95 |
| Control 1 | 3.7 | 2.19 |
| Polyethylene | 0 | 1.82 |

EXAMPLE 2

In a flask, 25 g of Cyanine Green (Pigment Green 7), 25g of a polyethylene wax (molecular weight 3,000; density, 0.93g/cm$^3$), 5 g of the organometal compound specified for each run in Table 2, and 150 g of toluene were mixed at 100° for 30 minutes. After the polyethylene wax was completely dissolved in toluene, the mixture was heated in an evaporator while the pressure was reduced. The toluene was recovered, and the residue was ground. Twenty g of the coloring agent thus obtained was mixed with 980 g of high-density polyethylene employed in Example 1, extruded through a 40-mm$\phi$ extruder at 170° C., and cut into colored pellets. Further 100 g of the colored pellets were blended with 900 g of the same high-density polyethylene, and the blend was formed into a plate by an injection molding machine. The results of measuring the deformation and shrinkage of the plates were as shown in Table 2.

CONTROL 2

Example 2 was repeated except that no organometal compound was added to the pigment, and the deformation and shrinkage of the so formed colored plate were measured. The results are also shown in Table 2.

Table 2

| | Organometal Compound | Deformation (cm) | Shrinkage (%) |
|---|---|---|---|
| (1) | γ-Aminopropyltriethoxysilane | 0 | 1.83 |
| (2) | γ-Methacryloxypropyltrimethoxysilane | 0.5 | 1.86 |
| (3) | β-(3,4-Epoxycyclohexyl)-ethyltrimethoxysilane | 0.2 | 1.85 |
| (4) | γ-Glycidoxypropyltrimethoxysilane | 0.3 | 1.86 |
| (5) | Tetraethoxysilane | 0.2 | 1.85 |
| (6) | Tetra isopropyl titanate | 0 | 1.83 |
| (7) | Tetra-n-butyl titanate | 0 | 1.84 |
| (8) | Tetra-n-butyl titanate dimer | 0 | 1.85 |
| (9) | Tetra-n-butyl titanate heptamer | 0.4 | 1.86 |
| (10) | Hydroxytitanium oleate | 0 | 1.83 |
| (11) | Triisopropoxytitanium-acetylacetone | 0 | 1.84 |
| (12) | Diisopropoxy titanium bis methyldiethanolamine | 0 | 1.84 |
| | Control 2 | 1.6 | 1.93 |

EXAMPLE 3

The procedures of Example 2 were repeated, insoluble Azo Yellow (Pigment Yellow 83) being used as the pigment, and γ-aminopropyltriethoxysilane being used as the organometal compound. The results of measuring the deformation and shrinkage of the colored plate were as given in Table 3.

CONTROL 3

Example 3 was repeated except that no organometal compound was used, and the deformation and shrinkage of the colored plate measured, with the results also shown in Table 3.

EXAMPLE 4

Example 3 was repeated, except that Perylene Red (Pigment Red 178) was used as the pigment and titanium lactate was used as the organometal compound. The colored plate's deformation and shrinkage were measured. The results were as shown in Table 3.

CONTROL 4

Example 4 was repeated except that no organometal compound was used, and the colored plate's deformation and shrinkage were measured. The results were as shown in Table 3.

Table 3

| | Deformation (cm) | Shrinkage (%) |
|---|---|---|
| Example 3 | 0 | 1.88 |
| Control 3 | 4.2 | 2.14 |
| Example 4 | 0 | 1.84 |
| Control 4 | 4.6 | 1.95 |

EXAMPLE 5

In a flask, 25 g of Perinone Orange (Pigment Orange 43), 25 g of stearylamide, 5 g of diisopropoxytitanium bis-isopropionate, and 150 g of toluene were mixed for 30 minutes at 100° C. The mixture was heated in an evaporator under reduced pressure, so that the toluene was recovered. The residue was ground. Three (3) g of coloring agent thus obtained and 1000 g of a high-density polyethylene (M.I. 4; density, 0.960 g/cm$^3$) (closeparen) were mixed in a tumbler and molded into a plate with an injection molding machine. The results of measuring the plate's deformation and shrinkage were as shown in Table 4.

For reference, the similarly measured values of the plate formed in the identical manner from polyethylene alone are also shown in the same Table.

CONTROL 5

Example 5 was repeated except that the use of diisopropoxytitanium bis isopropionate was omitted. The deformation and shrinkage of the product were as shown in Table 4.

EXAMPLE 6

Ten (10) g of Perynone Orange used in Example 5, 85 g of liquid paraffine, and 5 g of γ-amino-propyltrimethoxysilane were milled with three rolls, to prepare a paste color. In a tumbler 10 g of the paste color and 990 g of the high-density polyethylene used in Example 5 were mixed, and shaped into a plate with an injection molding machine. The deformation and shrinkage of the plate were as shown in Table 4.

CONTROL 6

Example 6 was repeated except that the use of γ-aminopropyltrimethoxysilane was omitted. The deformation and shrinkage of the plate were as shown in Table 4.

EXAMPLE 7

Twenty-five g of Anthraquinone Yellow (Pigment Yellow 108), 25g of ethylene-vinyl acetate copolymer (M.I. 1.5; density, 0.937g/cm$^3$; vinyl acetate content, 16%), 5 g of γ-aminopropyltriethoxysilane, and 250 g of toluene were placed in a flask, and stirred at 100° C. until the copolymer was perfectly dissolved in toluene. Then the toluene was removed from the mixture and recovered, by heating the mixture in an evaporator under a reduced pressure, and the residue was ground. Twenty g of thus obtained coloring agent and 980g of the high-density polyethylene used in Example 5 were mixed, and extruded through a 40-mmφ extruder. The extrudate was cut into colored pellets. One-hundred g of the colored pellets and 900 g of the aforesaid high-density polyethylene were blended, and shaped into a plate with an injection molding machine. The deformation and shrinkage of the plate were as shown in Table 4.

CONTROL 7

Example 7 was repeated except No. γ-amino-propyltriethoxysilane was used. The deformation and shrinkage of the plate were as shown in Table 4.

EXAMPLE 8

In a flask 25 g of Isoindolinone Yellow (Pigment Yellow 110), 25 g of the polyethylene wax used in Example 2, 2.5 g of γ-aminopropyltriethoxysilane, and 250 g of toluene, were stirred together at 100° C. After the polyethylene wax was completely dissolved in the toluene, the mixture was heated in an evaporator under a reduced pressure, and the toluene was recovered. The residue was ground. Twenty g of coloring agent thus obtained and 980 g of the high-density polyethylene used in Example 5 were mixed, extruded through a 40-mm$\phi$ extruder, and cut into colored pellets. One-hundred g of the colored pellets and 900 g of the aforesaid high-density polyethylene were blended, and shaped into a plate with an injection molding machine. The deformation and shrinkage of the plate were as shown in Table 4.

CONTROL 8

Example 8 was repeated except that no γ-aminopropyltriethoxysilane was used. The deformation and shrinkage of the plate were as shown in Table 4.

EXAMPLE 9

A 100-cc beaker was charged with 4 g of Isoindolinone Red (Pigment Red, 180), 6 g of magnesium stearate, 0.6 g of N-β-(aminoethyl)-γ-aminopropyltrimethoxysilane, and 30 g of water-ethanol (1:1) mixed solvent, and the content was mixed by stirring. The mixture was dried under a reduced pressure at 80° C., and the residue was ground. 2.5 grams of the so obtained coloring agent and 1,000 g of the high-density polyethylene used in Example 5 were dry-blended, and shaped into a plate through the injection molding machine, and the plate's deformation and shrinkage were measured, with the results as shown in Table 4.

CONTROL 9

Example 9 was repeated except that the use of N-β-(aminoethyl)-γ-aminopropyltrimethoxysilane was omitted.

The deformation and shrinkage of the plate were as given in Table 4 below.

Table 4

|  | Deformation (cm) | Shrinkage (%) |
| --- | --- | --- |
| Example 5 | 0 | 1.85 |
| Control 5 | 3.0 | 1.95 |
| Example 6 | 0 | 1.86 |
| Control 6 | 3.0 | 1.95 |
| Example 7 | 0.4 | 2.19 |
| Control 7 | 4.6 | 2.34 |
| Example 8 | 0 | 1.91 |
| Control 8 | 4.5 | 2.05 |
| Example 9 | 0.2 | 1.92 |
| Control 9 | 4.4 | 2.04 |
| Polyethylene | 0 | 1.84 |

EXAMPLE 10-a

A vacuum mixer was charged with 200 g Isoindolinone Yellow (Pigment Yellow 109), 300 g of a polyethylene wax (molecular weight, 5,000; density, 0.930 g/cm$^3$), 75 g of γ-aminopropyltriethoxysilane, and 1500 cc of toluene, and the mixing was effected at normal pressure and 100° C. for 30 minutes. After the polyethylene wax was completely dissolved, the system was gradually heated and the pressure reduced under stirring, and the toluene was recovered. The residue was ground to provide a coloring agent, 20 g of which was mixed with 980 g of a high-density polyethylene (M.I., 4; density, 0.97 g/cm$^3$) in a tumbler. The mixture was melt-extruded through a 40-mm$\phi$ extruder, and cut into colored pellets. A blend of 100 g of this colored pellets and 900 g of the above-specified high-density polyethylene was molded into a plate with an injection molding machine, and the plate's deformation and shrinkage were measured. The results were as shown in Table 5.

For reference, the similarly measured values of the plate composed of the above polyethylene alone are given concurrently.

EXAMPLE 10-b

EXAMPLE 10-a was repeated except that the 75 g of γ-aminopropyltriethoxysilane was replaced by 25 g of tetraethoxysilane and 25 g of tetraisopropyl titanate. The deformation and shrinkage of the so formed plate were as shown in Table 5.

CONTROL 10

Example 10-a was repeated except that no organometal compound was used. The deformation and shrinkage of the plate were as shown in Table 5.

EXAMPLE 11

Example 10-a was repeated except that the Isoindolinone Yellow was replaced by Dioxazine Violet (Pigment Violet 23). The deformation and shrinkage of the plate were as shown in Table 5.

CONTROL 11

Example 11 was repeated except that no organometal compound was used. The deformation and shrinkage of the plate were as shown in Table 5 below.

Table 5

|  | Deformation (cm) | Shrinkage (%) |
| --- | --- | --- |
| Example 10-a | 0 | 1.86 |
| Example 10-b | 0 | 1.86 |
| Control 10 | 3.7 | 2.19 |
| Example 11 | 0 | 1.84 |
| Control 11 | 0.9 | 1.91 |
| Polyethylene | 0 | 1.83 |

EXAMPLE 12

A flask was charged with 25 g of condensed Azo Red (Pigment Red 166), 25 g of a polyethylene wax (molecular weight, 4,000; density, 0.97g/cm$^3$), 3 g of an organometal compound specified for each run in Table 6, and 150 g of xylene. The mixture was stirred for 30 minutes at 100° C., and after the polyethylene wax was completely dissolved, xylene was recovered by subjecting the mixture to a gradual heating and gradually reduced pressure in an evaporator. The residue was ground to provide a coloring agent, 20 g of which was mixed with 960g of a high-density polyethylene (M.I. 5; density, 0.965 g/cm$^3$) in a tumbler. The mixture was extruded through a 40-mm$\phi$ extruder at an extruding temperature of 180° C., and cut into colored pellets. A blend of 50 g of the colored pellets and 950 g of the above-specified high-density polyethylene was shaped into a plate with an injection molding machine. The deformation and shrinkage of the plate were as shown in Table 6.

For reference, the similarly measured values of the plate formed of the specified polyethylene alone are given in the same Table.

CONTROL 12

Example 12 was repeated except that no organometal compound was used. The deformation and shrinkage of the plate were as shown also in Table 6.

Table 6

|  | Deformation (cm) | Shrinkage (%) |
| --- | --- | --- |
| (1) Diisopropoxy | 0 | 1.86 |

Table 6-continued

| | Deformation (cm) | Shrinkage (%) |
|---|---|---|
| titanium bis-diethanolamine | | |
| (2) Di-n-butoxy titanium bis-octyleneglycol | 0 | 1.87 |
| (3) Diisopropoxy-titanium di-ethylacetoacetate | 0 | 1.88 |
| Control 12 | 4.0 | 2.22 |
| Polyethylene | 0 | 1.81 |

EXAMPLE 13

Example 12 was repeated except that Quinacridone Red (Pigment Violet 19) was used as the pigment, and dissopropoxytitanium bisdiethanolamine was used as the organometal compound. The deformation and shrinkage of the plate were as shown in Table 7.

CONTROL 13

Example 13 was repeated except that no diisoproxytitanium bisdiethanolamine was used. The deformation and shrinkage of the plate were as shown in Table 7 below.

Table 7

| | Deformation (cm) | Shrinkage (%) |
|---|---|---|
| Example 13 | 0 | 1.84 |
| Control 13 | 0.8 | 1.90 |

EXAMPLE 14

Twenty-five g of Isoindolinone Orange (Pigment Orange 42), 2.5 g of diisopropoxy titanium bistriethanolamine, 75 g of the polyethylene wax used in Example 10-a, and 60 g of a water-ethanol mixed solvent (1:1) were mixed, milled with three heated rolls of 110°–120° C., and ground to provide a coloring agent, 40 g of which was mixed with 960 g of the high-density polyethylene used in Example 5. The mixture was extruded through a 40-mm$\phi$ extruder, and the extrudate was cut into colored pellets. A blend of 100 g of the colored pellets and 900 g of the above-specified high-density polyethylene formed in a tumbler was injection-molded into a plate. The deformation and shrinkage of the plate were as shown in Table 8.

CONTROL 14

Example 14 was repeated except that no diisoproxytitanium triethanolamine was used. The deformation and shrinkage of the plate were as shown in Table 8.

EXAMPLE 15

A 10-liter Henschel mixer was charged with 500 g of Cyanine Blue (Pigment Blue 15), and 25 g of tetrabutyl titanate tetramer was added little by little under stirring. The system was stirred for an additional 3 minutes, followed by the addition of 500 g of aluminium stearate and stirred for approximately 2 more minutes. Two g of coloring agent thus formed was blended with 1000 g of the high-density polyethylene used in Example 12 in a tumbler, and the mixture was injection-molded into a plate. The deformation and shrinkage of the plate were as shown in Table 8.

CONTROL 15

Example 15 was repeated except that no tetrabutylititanate tetramer was used. The deformation and shrinkage of the plate were as shown also in Table 8.

Table 8

| | Deformation (cm) | Shrinkage (%) |
|---|---|---|
| Example 14 | 0 | 1.87 |
| Control 14 | 3.6 | 1.98 |
| Example 15 | 1.0 | 1.89 |
| Control 15 | 3.2 | 1.92 |

We claim:
1. A moldable polyethylene capable of being molded into colored shaped articles with reduced deformation and shrinkage comprising (A) a medium or low pressure, high density polyethylene having a melt index of no more than 50 and a density of at least 0.94 g/cm$^3$ and (B) a coloring composition which comprises (I) 100 parts by weight of cyanine green (Pigment Green 7) and (II) about 20 to about 30 parts by weight of an organtitanium compound selected from the group consisting of tetraisopropyl titanate, hydroxy titanium oleate and diisopropoxy titanium bistriethanolamine.

2. A molded, shaped article formed from the moldable polyethylene of claim 1.

3. A moldable polyethylene capable of being molded into colored shaped articles with reduced deformation and shrinkage comprising (A) a medium or low pressure, high density polyethylene having a melt index of no more than 50 and a density of at least 0.94 g/cm$^3$ and (B) a coloring composition which comprises (I) 100 parts by weight of an organic pigment selected from the group consisting of Isoindolinone Yellow (Pigment Yellow 109), Cyanine Green (Pigment Green 7), Azo Yellow (Pigment Yellow 83), Perylene Red (Pigment Red 178), Perinone Orange (Pigment Orange 43), Anthraquinone Yellow (Pigment Yellow 108), Isoindolinone Yellow (Pigment Yellow 110), Isoindolinone Red (Pigment Red 180), Dioxazine Violet (Pigment Violet 23), Azo Red (Pigment Red 166), Quinacridone Red (Pigment Violet 19), Isoindolinone Orange (Pigment Orange 42), and Cyanine Blue (Pigment Blue 15) and (II) from about 10 to about 30 parts by weight of an organosilane compound selected from the group consisting of γ-aminopropyltriethyoxysilane, γ-aminopropyltrimethoxysilane, β-aminoethyltributoxysilane; N-γ-(aminopropyl)γ-aminopropyl-triethoxysilane and N-β-(aminoethyl)-γ-aminopropyltrimethoxysilane.

4. A molded, shaped article formed from the moldable polyethylene composition of claim 3.

5. A moldable polyethylene capable of being molded into colored shaped articles with reduced deformation and shrinkage comprising (A) a medium or low pressure, high density polyethylene having a melt index of no more than 50 and a density of at least 0.94 g/cm$^3$ and (B) a coloring composition which comprises (I) 100 parts by weight of an organic pigment selected from the group consisting of Isoindolinone Yellow (Pigment Yellow 109), Cyanine Green (Pigment Green 7), Azo Yellow (Pigment Yellow 83), Perylene Red (Pigment Red 178), Perinone Orange (Pigment Orange 43), Anthraquinone Yellow (Pigment Yellow 108), Isoindolinone Yellow (Pigment Yellow 110), Isoindolinone Red (Pigment Red 180), Dioxazine Violet (Pigment Violet 23), Azo Red (Pigment Red 166), Quinacridone Red (Pigment Violet 19), Isoindolinone Orange (Pigment Orange 42), and Cyanine Blue (Pigment Blue 15) and (II) from about 10 to about 30 parts by weight of an organotitanium compound selected from the group consisting of tetra-iso-propyl titanate, hydroxy titanium oleate, diisopropoxy titanium bistriethanolamine, tetra-n-propyl titanate, tetrabutyl titanate, and diisopropoxy titanium bisacetylacetone.

6. A moldable, shaped article formed from the moldable polyethylene composition of claim 5.

* * * * *